United States Patent [19]
Gribbon

[11] Patent Number: 5,891,411
[45] Date of Patent: Apr. 6, 1999

[54] METHOD FOR PURIFYING EXHAUST FROM WOOD MANUFACTURING PROCESSES

[75] Inventor: Sean T. Gribbon, Farmington Hills, Mich.

[73] Assignee: Engelhard Corporation, Iselin, N.J.

[21] Appl. No.: 764,455

[22] Filed: Dec. 12, 1996

Related U.S. Application Data

[63] Continuation of Ser. No. 387,464, Feb. 13, 1995, abandoned.

[51] Int. Cl.$^6$ .......................... B01D 53/44; B01D 53/72
[52] U.S. Cl. ...................................... 423/245.3; 423/210
[58] Field of Search .................. 423/245.3, 247, 423/418.2, DIG. 13, 210; 422/171, 177

[56] References Cited

U.S. PATENT DOCUMENTS

| | | | |
|---|---|---|---|
| 4,213,947 | 7/1980 | Fremont et al. | 423/245.3 |
| 4,400,356 | 8/1983 | McVay et al. | 422/171 |
| 4,425,305 | 1/1984 | Retallick | 422/180 |
| 4,430,303 | 2/1984 | Linde | 422/177 |
| 4,584,177 | 4/1986 | Fernbach et al. | 422/115 |
| 4,646,712 | 3/1987 | Ferguson et al. | 126/79 |
| 4,791,091 | 12/1988 | Bricker et al. | 502/303 |
| 5,262,131 | 11/1993 | Bayer et al. | 422/175 |
| 5,263,266 | 11/1993 | Schmidt | 34/79 |
| 5,286,467 | 2/1994 | Sun et al. | 423/239.1 |
| 5,364,259 | 11/1994 | Matros et al. | 431/5 |
| 5,417,927 | 5/1995 | Houston | 422/110 |

FOREIGN PATENT DOCUMENTS

| | | |
|---|---|---|
| 0 412 591 A1 | 7/1990 | European Pat. Off. . |
| 0 629 432 A1 | 6/1994 | European Pat. Off. . |

*Primary Examiner*—Michael Lewis
*Assistant Examiner*—Peter DiMauro
*Attorney, Agent, or Firm*—Lyon, P.C.

[57] ABSTRACT

A method for the abatement of contaminant-laden process emissions produced by various wood manufacturing processes comprises the step of flowing the emissions through an oxidation catalyst located in a regenerative catalytic oxidizer to remove volatile organic compounds (VOC's), methanol, formaldehyde, resins, binders, and hazardous air pollutants (HAP's) at lower peak temperatures than the temperatures encountered in regenerative thermal oxidizers. The oxidation catalyst allows the overall abatement process to operate at lower peak combustion temperatures. By reducing the peak combustion temperatures during the abatement of emissions, the present invention precludes potassium and/or sodium in the emissions from reacting with silica in the heat recovery media and ceramic fiber insulation of the regenerative thermal oxidizer. This reaction has heretofore destroyed the desired properties of the wood product and compromised the quality of the product.

1 Claim, 1 Drawing Sheet

METHOD FOR PURIFYING EXHAUST FROM WOOD MANUFACTURING PROCESSES

This application is a continuation of application Ser. No. 08/387,464 filed on Feb. 13, 1995, abandoned.

BACKGROUND OF THE INVENTION

The present invention relates generally to the abatement of contaminant laden exhaust from various wood manufacturing processes, and more particularly to a method that prevents destruction of the desired properties of the manufactured wood products during the abatement process.

The manufacture of various wood products, such as oriented strand board, medium density fiberboard, particle board, or plywood, typically requires processing under elevated temperatures to achieve certain desired properties and characteristics for the wood products. One available method for generating heat is to burn wood fuels such as bark, sander dust, hogfuel, shavings, or waste lumber, since these fuels are readily available as natural by-products of the wood manufacturing process. The heat generated by burning these wood fuels is often utilized to dry wood chips, fiber, veneer, or other types of wood selected as components of the ultimate wood product.

The wood selected for drying is often treated with resins or binders prior to the drying process. During the drying process, these resins or binders, along with other contaminants such as volatile organic compounds (VOC's), methanol, and formaldehyde are emitted by the drying wood. In addition, the wood fuel burning operation generates and emits other contaminants, such as carbon monoxide and many hazardous air pollutants (HAP's). Federal laws and regulations require that the concentration of these aforementioned contaminants in the process emissions must be reduced prior to discharge into the atmosphere.

Regenerative thermal oxidizers have heretofore been utilized to control the concentration of VOC's, methanol, formaldehyde, carbon monoxide, and HAP's which are vented to the atmosphere. In addition, electronic gravel filter beds or wet electrostatic precipitators may be utilized where removal of particulates such as a blue haze is also required.

Generally, thermal oxidizers utilize a supplementary heat source to increase the temperature of the contaminated process emissions to a level above the ignition temperature of the combustible contaminants, so as to oxidize the combustible contaminants, such as VOC's, methanol, formaldehyde, HAP's, and carbon monoxide. Regenerative thermal oxidizers recover heat remaining in the cleansed exhaust gas to increase the temperature of emissions entering the oxidizer thereby decreasing the amount of supplemental energy required to raise the emission to its ignition temperature.

However, when wood fuels are burned during the drying process, the regenerative thermal oxidizers utilized under present technology are not fully satisfactory because of the high temperatures encountered therein, which typically range from 1400° F. ($\approx$760° C.) to 1500° F. ($\approx$815° C.). More specifically, the wood fuel burning operation also produces by-products which include potassium and sodium. In addition, both the heat recovery media and the ceramic fiber insulation of the regenerative thermal oxidizer contain silica. The potassium and/or sodium from the process emissions react with the silica found in the regenerative thermal oxidizer at temperatures exceeding 1100° F. to 1200° F., depending upon the concentration of the potassium and/or sodium in the process emissions. As noted above, regenerative thermal oxidizers must operate at temperatures well above these threshold temperatures, thereby inherently causing the potassium and sodium to react with silica. Simply lowering the operating temperature of the thermal oxidizer does not provide a suitable solution because at temperatures below 1400° F., a regenerative thermal oxidizer will not only fail to properly remove existing pollutants, but the regenerative thermal oxidizer will actually generate even more carbon monoxide and HAP's. The reaction of potassium and sodium with silica is highly undesirable and problematic because the reaction destroys the desired properties and characteristics of the manufactured wood products, and thereby diminishes the effectiveness and quality of the products.

SUMMARY OF THE INVENTION

The aforesaid problems are solved, in accordance with the present invention, by a method for purifying exhaust from various wood manufacturing processes, which includes a regenerative catalytic oxidizer. The regenerative catalytic oxidizer utilizes a catalytic oxidation material to effect oxidation of VOC's, methanol, formaldehyde, carbon monoxide, resins, binders, and HAP's at lower peak temperatures than those temperatures at which regenerative thermal oxidizers function. The catalytic oxidation materials include but are not limited to, metal catalysts such as platinum, palladium, rhodium, iridium, ruthenium, vanadium, copper, manganese, cerium and chromium, as well as metal oxide catalysts such as manganese oxide or chromium oxide, and also any combination of the metal and/or metal oxide catalysts.

In accordance with the present invention, the regenerative catalytic oxidizer effects oxidation of VOC's, methanol, formaldehyde, carbon monoxide, and HAP's at temperatures typically ranging from 500° F. to 1000° F. ($\approx$538° C.), depending upon the constituents and respective concentrations of the contaminants in the process emissions. By effecting oxidation at temperatures well below the reaction threshold temperature of 1100° F., the regenerative catalytic oxidizer of the present invention precludes the potassium and/or sodium from reacting with the silica, a reaction which has heretofore compromised the properties and quality of manufactured wood products.

The present invention advantageously accommodates the continuing use of wood burners, as opposed to requiring alternative fuels which do not generate potassium or sodium, such as natural gas. In the manufacture of wood, maintaining the use of already abundant wood scraps as a fuel is beneficial because an additional fuel cost is not required. In addition, the present invention obviates a need for an insulating liner on ceramic fibers in order to otherwise prevent potassium and/or sodium from exposure to silica. The present invention also minimizes auxiliary heat requirements and electrical consumption, which have heretofore increased abatement expenses.

DETAILED DESCRIPTION OF THE PREFERRED EMBODIMENT(S)

In a preferred embodiment, the invention is in a method for purifying air contaminated with emissions produced by a wood manufacturing process wherein the emission contaminated air is input into a regenerative oxidizer having regenerative heat exchange media containing silica therein, and a heat source for combusting the combustible contaminants in the emissions, the method further comprising the steps of: heating the contaminated emissions to a peak combustion temperature less than approximately 1000° F., regulated by a thermally actuated control unit; inputting the contaminated emissions into an oxidation catalyst means located within said oxidizer, wherein the oxidation catalyst effects combustion of the contaminated emissions at temperatures below 1000° F. so as to produce cleansed air and preclude a reaction of potassium or sodium generated by the wood manufacturing process with the silica in said oxidizer, said regenerative catalytic oxidizer comprising a plurality of regenerative beds adapted to cyclically perform a feed mode, a heat exchanger exhaust mode, and a purge mode, a network of ducts comprising inlet, purge and outlet ducts for each bed, a heat exchange medium for each bed, oxidation catalyst for each bed for receiving emission feed from each bed respectively, a combustion chamber that is common to said oxidation catalyst and plurality of beds, and cycling valves for recapturing said cleansed air and controlling said feed, exhaust and purge modes for each bed including a purge inlet duct for each bed for bed purge and for purge of its respective oxidation catalyst, recapturing said cleansed air, recycling the cleansed air as purge air through one regenerative bed and its respective oxidation catalyst, and exhausting said purge air via said common combustion chamber to and through a different bed of said plurality of further purge of its oxidation catalyst and respective regenerative bed.

Figure 1:
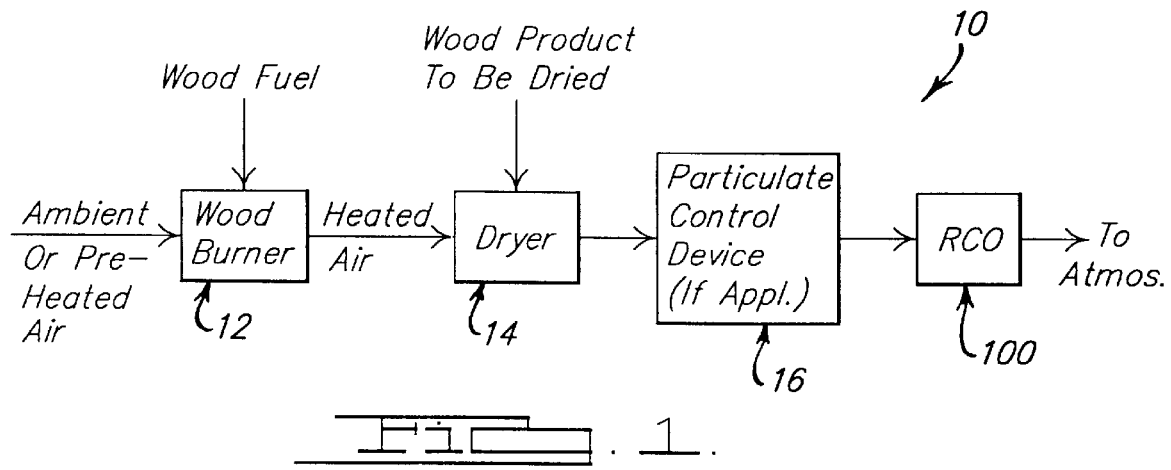
FIG. 1 is a diagrammatic representation of a wood manufacturing/abatement system, in accordance with the present invention.

Referring to FIG. 1, a wood manufacturing/abatement system 10 is shown in accordance with the present invention. A wood burner 12 heats ambient or pre-heated air by burning wood fuels, such as bark, sander dust, hogfuel, shavings, or waste lumber. The air heated by wood burner 12 is then utilized by dryer 14. The dryer 14 uses the hot air to dry a predetermined type of wood which is selected as a component of the product produced by the system 10. For example, the dryer may be utilized to dry wood chips, fiber, veneer or any other desired types of wood.

Abatement of the contaminant-laden emissions produced by wood burner 12, dryer 14, or elsewhere in the manufacturing process, is then required. If particulates such as a blue haze are also present, the process emissions may be conducted into a particulate control device 16 as perhaps an electronic gravel filter bed or a wet electrostatic precipitator. In systems which do not generate a significant particulate concentration in the emissions, particulate control device 16 may be omitted.

In accordance with the present invention, the emissions are conducted from dryer 14, or alternatively, particulate control device 16, into a regenerative catalytic oxidizer 100 for oxidation of combustible contaminants such as VOC's, methanol, formaldehyde, carbon monoxide, resins, binders, and HAP's.

Figure 2:
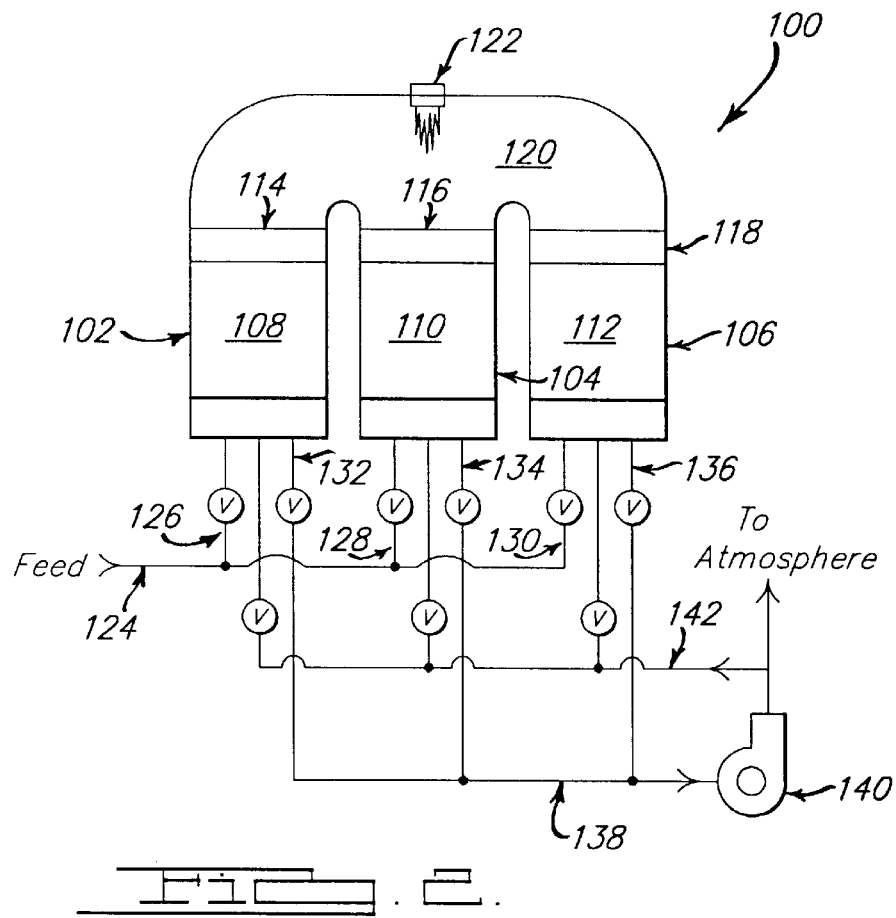
FIG. 2 is a diagrammatic representation of a regenerative catalytic oxidizer, in accordance with the present invention.

Referring now to FIG. 2, a regenerative catalytic oxidizer 100 (hereinafter "RCO") is shown, in accordance with the present invention as comprising three conventional regenerator beds 102, 104, and 106, which are each provided with a heat exchange media 108, 110, and 112, respectively. The ROC 100 further comprises three oxidation catalysts 114, 116, and 118. The oxidation catalysts may be satisfactorily implemented as, for example, a metal or a metal oxide deposited on a substrate. The metals or metal oxides that may be utilized include but are not limited to, platinum, palladium, rhodium, iridium, ruthenium, vanadium, copper, manganese, cerium, chromium, manganese oxide, chromium oxide, as well as any combination thereof. A common combustion chamber 120 communicates with each oxidation catalyst 114, 116, and 118. Fuel, for example natural gas, is supplied to the combustion chamber 120 from a fuel controller and burner 122 or other heat source.

A contaminated emission feed duct 124 admits process emissions from dryer 14 or, if required, particulate control device 16, into the RCO 100 through inlet ducts 126, 128, and 130. It is noted that the optional particulate control device 16 is preferably positioned upstream of RCO 100 so as to prevent rapid plugging or "fouling" of regenerator beds 102, 104, and 106. Cleansed air is conducted away from RCO 100 by outlet ducts 132, 134, and 136, respectively, which feed a cleansed exhaust output duct 138, with the cleansed air vented to atmosphere by an exhaust blower 140. A purge input duct 142 cyclically recaptures cleansed air discharged by blower 140 in order to purge beds 102, 104, and 106 as well as catalysts 114, 116, and 118 of contaminants trapped therein. The RCO 110 utilizes a valve network to control the cyclic flow of contaminated emissions and cleansed air to and from the RCO 100, respectively.

The three chamber system of the RCO 100 operates in three cycles. In a first exemplary cycle, emissions pass into regenerator bed 102 to pick up heat therefrom, then through catalyst 114 for oxidation. Following oxidation of contaminants to, for example, carbon dioxide and water, the cleansed air then passes through regenerative bed 104 and catalyst 116, which are operating in the regenerative, or heat receptive, mode for discharge to atmosphere or into purge input duct 142, which in turn conducts purified air to regenerator bed 106 and catalyst 118 to purge the bed and catalyst of contaminants. Thus, each regenerator bed cyclically performs three modes of operation: a feed mode, a heat exchange exhaust mode, and a purge mode.

It is noted that FIG. 2 shows a three-chamber RCO 100 having three regenerative beds 102, 104, and 106, and three oxidation catalyst beds 114, 116, and 118, but the present invention is not limited by the number of chambers in the RCO 100. It is further noted that an existing regenerative thermal oxidizer may be equipped with catalytic oxidation beds in order to convert an existing regenerative thermal oxidizer into RCO 100, in accordance with the present invention.

In operation, the RCO 100 of the present invention effects oxidation of the aforesaid combustible contaminants at temperatures ranging from approximately 500° F. (≈260° C.) to 1000° F. (≈538° C.) depending upon the constituents and the respective concentrations of the contaminants in the process emissions. These reduced peak combustion temperatures provided by the RCO 100 preclude a reaction of potassium and/or sodium produced by wood burner 12 with silica from the heat recovery media 108, 110, and 112, or from ceramic fiber insulation in the RCO 100. By preventing the potassium and/or sodium from reacting with silica, the present invention enhances the quality of wood products because the desired properties and characteristics of the wood products are retained.

While the preferred embodiment of the invention has been disclosed, it should be appreciated that the invention is susceptible of modification without departing from the scope of the following claims.

I claim:

1. A method for purifying air contaminated with emissions produced by a wood manufacturing process wherein a regenerative catalytic oxidizer is utilized comprising a plurality of regenerative beds, and, inlet, purge, and exhaust valves and ducts, for each of the regenerative beds, each regenerative bed also comprising a regenerative heat exchange media containing silica therein, a plurality of catalyst beds wherein each of the catalyst beds corresponds to one of the regenerative beds, and a heat source for combusting contaminants in the emissions, the method comprising the steps of:

- providing a plurality of catalyst beds effective to remove the pollutants in the contaminated emissions, the catalyst comprising metals or metal oxides selected from the group consisting of platinum, palladium, rhodium, iridium, ruthenium, vanadium, copper, manganese, cerium, chromium, manganese oxide, chromium oxide, and any combination thereof;
- injecting the contaminated emissions which contain potassium and/or sodium into an inlet regenerative heat exchange media of the regenerative catalytic oxidizer;
- heating the contaminated emissions to a peak combustion temperature less than approximately 1000° F. and greater than 500° F., wherein the temperature is controlled by a thermally actuated control unit;
- inputting the contaminated emissions into the catalyst bed thereby oxidizing the contaminated emissions at temperatures below 1000° F. and producing cleansed air, and feeding the cleansed air thus produced into the heat exchange media thereby precluding reaction of potassium and sodium, with the silica comprising the heat exchange media;
- conducting the cleansed air through a combustion chamber common to the plurality of regenerative beds;
- conducting the cleansed air through an exhaust regenerative bed and out a respective exhaust duct;
- cycling valves for recapturing the cleansed air and controlling feed, exhaust, and purge modes for each regenerative bed;
- recapturing a portion of the cleansed air;
- recycling the portion of the cleansed air as purge air through one regenerative bed and its respective catalyst bed; and
- exhausting the purge air via the common combustion chamber to and through a different catalyst bed of the plurality of catalyst beds, and to and through a corresponding regenerative bed of the plurality of regenerative beds, for further purge and heating of the catalyst bed and the corresponding regenerative heat exchange media.

* * * * *